(12) United States Patent
Forbes

(10) Patent No.: US 6,178,731 B1
(45) Date of Patent: Jan. 30, 2001

(54) GARDEN TOOL WITH MULTIPLE TIERS

(76) Inventor: Jason K. Forbes, 269 Cook Street, Barrie, Ontario (CA), L4M 5H7

(*) Notice: Under 35 U.S.C. 154(b), the term of this patent shall be extended for 0 days.

(21) Appl. No.: 09/244,413

(22) Filed: Feb. 4, 1999

(51) Int. Cl.[7] .................................................. A01D 7/00
(52) U.S. Cl. ...................... 56/400.01; 56/400.2; 172/371
(58) Field of Search .......................... 56/400.01, 400.04, 56/400.05, 400.16, 400.19, 400.2; 172/371, 373, 374, 375, 378, 380; 7/114, 115, 116; 294/51, 52

(56) References Cited

U.S. PATENT DOCUMENTS

| D. 277,258 | * | 1/1985 | Baty .................................. D8/1.13 |
| D. 305,604 | * | 1/1990 | Keblbek ................................... D8/7 |
| 878,920 | * | 2/1908 | Williams ............................... 172/375 |
| 1,006,819 | * | 10/1911 | Adams .................................. 172/375 |
| 1,328,121 | * | 1/1920 | Brown .................................. 172/375 |
| 1,364,140 | * | 1/1921 | Persson ................................ 172/375 |
| 1,823,254 | * | 9/1931 | Casse ..................................... 172/13 |
| 1,931,349 | * | 10/1933 | Habig ...................................... 30/315 |
| 2,351,136 | * | 6/1944 | Linden ................................. 172/375 |
| 2,536,180 | * | 1/1951 | Hines .................................... 172/372 |
| 2,548,012 | * | 4/1951 | Frost .................................... 172/374 |
| 2,753,785 | * | 7/1956 | Zenk ...................................... 172/13 |
| 2,785,483 | * | 3/1957 | Gajewski ................................ 37/284 |
| 3,952,812 | * | 4/1976 | Lucan .................................. 172/375 |
| 4,351,395 | * | 9/1982 | Lilley ..................................... 172/13 |
| 4,359,104 | * | 11/1982 | Haapala .............................. 172/372 |
| 4,564,072 | * | 1/1986 | Corbett .................................. 172/13 |
| 4,645,010 | * | 2/1987 | Luedeman ............................. 172/13 |
| 4,730,679 | * | 3/1988 | Tallerico et al. .................... 172/375 |
| 4,892,156 | * | 1/1990 | Willis .................................. 172/381 |
| 4,901,801 | * | 2/1990 | Popivalo ............................. 172/378 |
| 5,004,053 | * | 4/1991 | Martell ................................ 172/375 |
| 5,142,855 | * | 9/1992 | Guidarelli ........................ 56/400.16 |
| 5,452,769 | * | 9/1995 | Markert ............................... 172/380 |
| 5,816,338 | * | 10/1998 | Fleming ............................. 172/381 |
| 5,964,299 | * | 10/1999 | Padgett ............................... 172/378 |

* cited by examiner

Primary Examiner—Thomas B. Will
Assistant Examiner—Arpad Fabian Kovacs

(57) ABSTRACT

A garden tool including a head having a front edge with an upturned edge formed thereon and a rear edge with a point thereon. Also included is a handle mounted on the head for utilizing the same to till soil.

1 Claim, 2 Drawing Sheets

FIG. 3
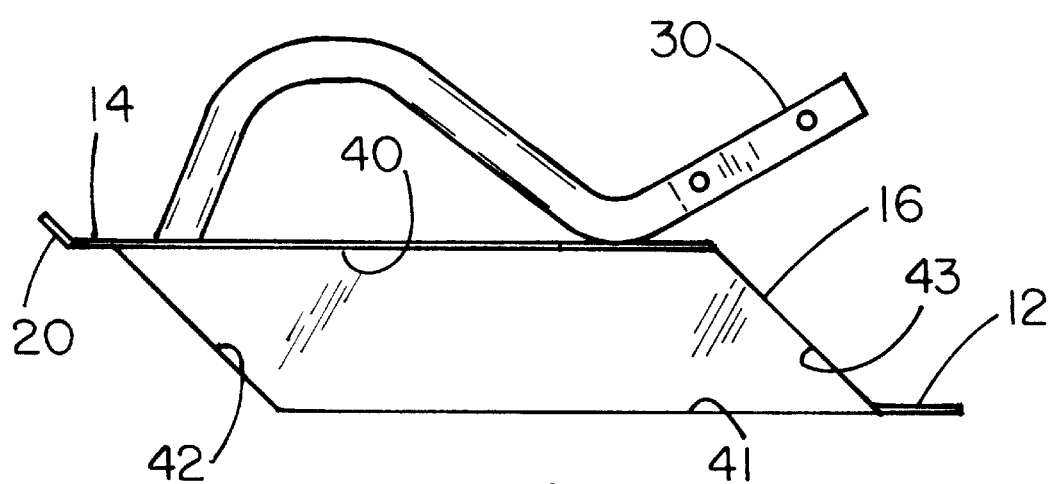
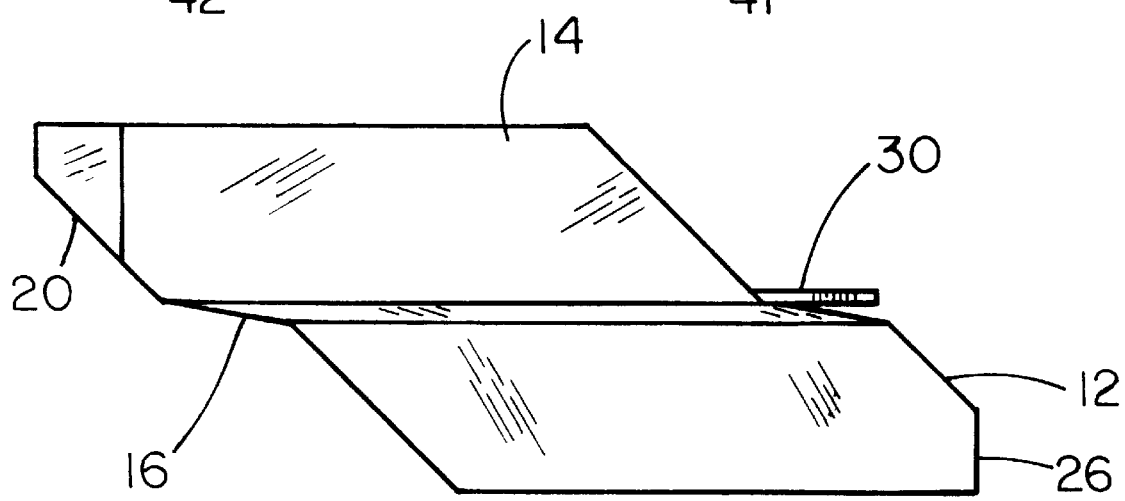
FIG. 4

GARDEN TOOL WITH MULTIPLE TIERS

BACKGROUND OF THE INVENTION

1. Field of the Invention

The present invention relates to garden tools and more particularly pertains to a new angled garden tool for manipulating earth from a standing or crouch position.

2. Description of the Prior Art

The use of garden tools is known in the prior art. More specifically, garden tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,753,785; U.S. Pat. No. 1,823,254; U.S. Pat. No. Des. 305,604; U.S. Pat. No. 4,645,010; U.S. Pat. No. 1,931,349; and U.S. Pat. No. 4,351,395.

In these respects, the angled garden tool according to the present invention substantially departs from the conventional concepts and designs of the prior art, and in so doing provides an apparatus primarily developed for the purpose of manipulating earth from a standing or crouch position.

SUMMARY OF THE INVENTION

In view of the foregoing disadvantages inherent in the known types of garden tools now present in the prior art, the present invention provides a new angled garden tool construction wherein the same can be utilized for manipulating earth from a standing or crouch position.

The general purpose of the present invention, which will be described subsequently in greater detail, is to provide a new angled garden tool apparatus and method which has many of the advantages of the garden tools mentioned heretofore and many novel features that result in a new angled garden tool which is not anticipated, rendered obvious, suggested, or even implied by any of the prior art garden tools, either alone or in any combination thereof.

To attain this, the present invention generally comprises a head having a first side extent with a substantially planar rhomboid configuration. The first side extent is defined by a pair of elongated side edges and a pair of short end angled garden tools forming acute and obtuse angles with the side angled garden tools. Associated therewith is a central extent with a substantially planar rhomboid configuration defined by a pair of elongated side edges and a pair of short end edges. Similar to those of the first side extent of the head, the short end edges of the central extent form acute and obtuse angles with the side edges. Further, one of the side edges of the central extent is integrally coupled to one of the side edges of the first side extent. As such, the first side extent resides in a plane that forms a 120 degree angle with that in which the central extent resides. The head further includes a second side extent with a substantially planar rhomboid configuration defined by a pair of elongated side edges and a pair of short end edges forming acute and obtuse angles, as set forth hereinabove. One of the side edges of the second side extent is integrally coupled to one of the side edges of the central extent. As such, the second side extent resides in a plane that forms a 120 degree angle with that in which the central extent resides. Such second side extent further remains in parallel with that in which that first side extent resides. As shown in FIGS. 1 & 2, the first side extent of the head further includes an upturned extension integrally formed on one of the end edges thereof. Such extension resides adjacent to one of the side edges opposite the central extent of the head. The extension has a width of about ½ that of the first side extent of the head. An outer terminal edges of the extension is sharpened and has a first linear portion and a second beveled portion. One of the end edges of the second side extent of the head has a triangular configuration. Such triangular end edges is positioned on a diagonally opposed side of the head with respect to the upturned extension. As shown in FIGS. 1 & 2, a grip, or handle, is provided with a planar inverted U-shaped configuration having a pair of ends coupled to a top surface of the first side extent of the head. The grip is preferably positioned adjacent to the central extent of the head. In use, the grip lies within a plane positioned in perpendicular relationship with that in which the first side extent of the head resides. Finally, a handle rod mount includes a substantially conical socket having a tapered end integrally coupled to one of the ends of the grip. The handle rod mount extends away from the extension of the first side extent of the head and further remains in coplanar relationship with the grip. Ideally, the handle rod mount is situated at an angle of about 30 degrees with respect to the plane in which the first side extent of the head resides. The handle rod mount preferably has a pair of bores formed therein for removably coupling a hand rod therein in coaxial relationship therewith.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new angled garden tool apparatus and method which has many of the advantages of the garden tools mentioned heretofore and many novel features that result in a new angled garden tool which is not anticipated, rendered obvious, suggested, or even implied by any of the prior art garden tools, either alone or in any combination thereof.

It is another object of the present invention to provide a new angled garden tool which may be easily and efficiently manufactured and marketed.

It is a further object of the present invention to provide a new angled garden tool which is of a durable and reliable construction.

An even further object of the present invention is to provide a new angled garden tool which is susceptible of a low cost of manufacture with regard to both materials and labor, and which accordingly is then susceptible of low prices of sale to the consuming public, thereby making such angled garden tool economically available to the buying public.

Still yet another object of the present invention is to provide a new angled garden tool which provides in the apparatuses and methods of the prior art some of the advantages thereof, while simultaneously overcoming some of the disadvantages normally associated therewith.

Still another object of the present invention is to provide a new angled garden tool for manipulating earth from a standing or crouch position.

Even still another object of the present invention is to provide a new angled garden tool that includes a head having a front edges with an upturned angled garden tool formed thereon and a rear edges with a point thereon. Also included is a handle mounted on the head for utilizing the same to till soil.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side view of the present invention.

FIG. 4 is a lower perspective view of the present invention.

DESCRIPTION OF THE PREFERRED EMBODIMENT

Figure 2:
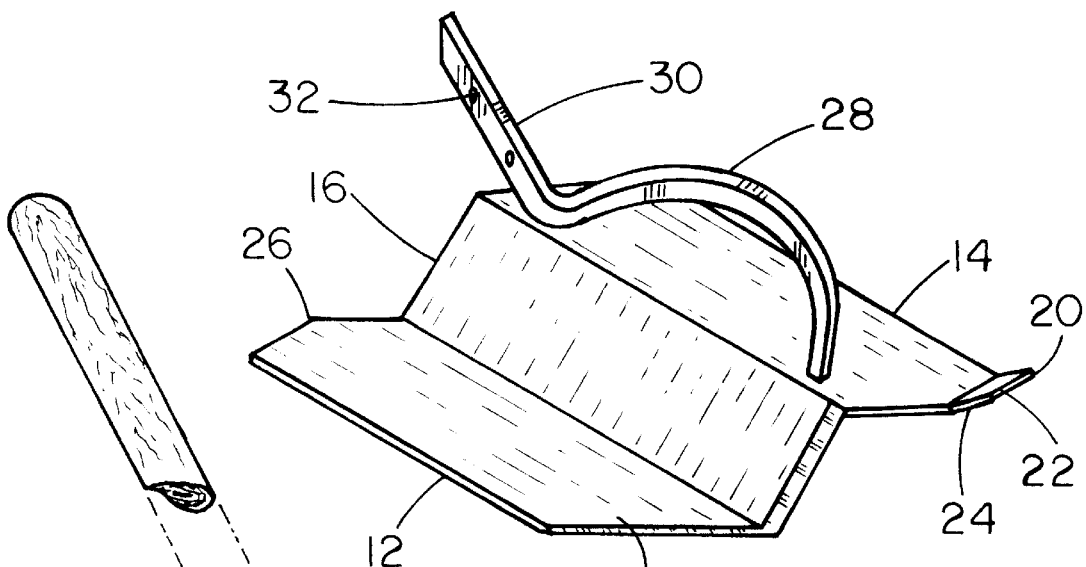
FIG. 2 is a perspective view of the present invention with the handle rod attached to the handle rod mount.

With reference now to the drawings, and in particular to FIGS. 1 through 4 thereof, a new angled garden tool embodying the principles and concepts of the present invention and generally designated by the reference numeral 10 will be described.

The present invention, designated as numeral 10, includes a head 12 having a first side extent 14 with a substantially planar rhomboid configuration. The first side extent is defined by a pair of elongated side edges and a pair of short end edges forming acute and obtuse angles with the side edges.

Associated therewith is a central extent 16 with a substantially planar rhomboid configuration defined by a pair of elongated side edges 40, 41 and a pair of short end edges 42, 43. Similar to those of the first side extent of the head, the short end edges of the central extent form acute and obtuse angles with the side edges. Further, one of the side edges of the central extent is integrally coupled to one of the side edges of the first side extent. As such, the first side extent resides in a plane that forms a 120 degree angle with that in which the central extent resides.

The head further includes a second side extent 18 with a substantially planar rhomboid configuration defined by a pair of elongated side edges and a pair of short end edges forming acute and obtuse angles, as set forth hereinabove. One of the side angled garden tools of the second side extent is integrally coupled to one of the side edges of the central extent. As such, the second side extent resides in a plane that forms a 120 degree angle with that in which the central extent resides. Such second side extent further remains in parallel with that in which that first side extent resides.

In the preferred embodiment, end edges of the second side extent are rearwardly positioned with respect to the end edges of the first side extent with the central extent between beveled therebetween.

Figure 1:
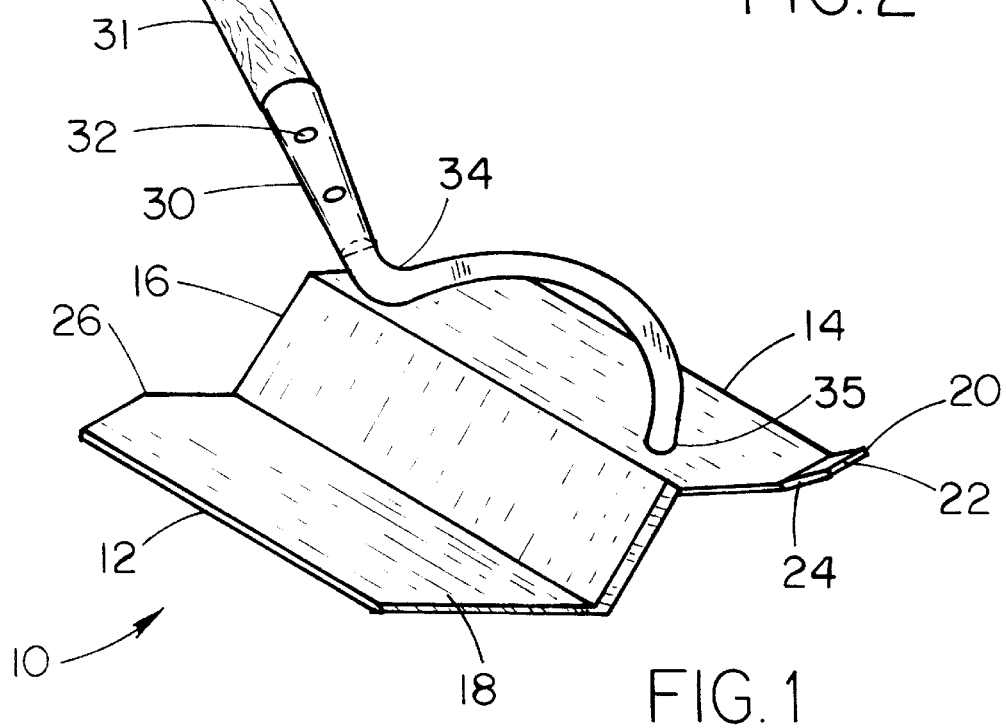
FIG. 1 is a perspective view of a new angled garden tool according to the present invention without the handle rod.

As shown in FIGS. 1 & 2, the first side extent of the head further includes an upturned extension 20 integrally formed on one of the end edges thereof. Such extension resides adjacent to one of the side edges opposite the central extent of the head. The extension has a width of about ½ that of the first side extent of the head. An outer terminal angled garden tool of the extension is sharpened and has a first linear portion 22 and a second beveled portion 24.

One of the end edges of the second side extent of the head has a tapered configuration 26. Such tapered end edges is positioned on a diagonally opposed side of the head with respect to the upturned extension. The tapered end edges is thus ideally tailored for cutting lawn.

As shown in FIGS. 1 & 2, a grip 28, or a handle, is constructed from a planar member having an inverted U-shaped configuration with a pair of ends 34, 35 coupled to a top surface of the first side extent of the head. Ideally, the grip has a pair of legs which positioned at a 69.8 and 37.5 degree angle with respect to the plane in which the first side extent resides, respectively. The grip is preferably positioned adjacent to the central extent of the head. In use, the grip lies within a plane positioned in perpendicular relationship with that in which the first side extent of the head resides.

Finally, a handle rod mount 30 includes a substantially conical socket having a tapered end integrally coupled to one of the ends of the grip. The handle rod mount extends away from the extension of the first side extent of the head and further remains in coplanar relationship with the grip. Ideally, the handle rod mount is situated at an angle of about 30 degrees with respect to the plane in which the first side extent of the head resides. The handle rod mount preferably has a pair of bores 32 formed therein for removably coupling a handle rod 31 therein in coaxial relationship therewith. In use, the angled extents of the head are adapted for plowing soil form the ground, eliminating the need to turn soil over with a spade, shovel, or another tool.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A garden tool comprising, in combination:

a head including a first side extent and a second side extent, each of the side extents having a substantially planar configuration defined by a pair of elongated side edges and a pair of short end edges, the side edges being oriented substantially parallel to each other and the end edges being oriented substantially parallel to each other, the end edges being oriented at an acute angle with respect to the side edges, the head further having a central extent with a substantially planar rhomboid configuration defined by a pair of elongated side edges and a pair of short end edges, wherein a first one of the side edges of the central extent is integrally coupled to one of the side edges of the first side extent such that the first side extent lies in a plane that forms a 120 degree angle with a plane in which the central extent lies, wherein one of the side edges of the second side extent is integrally coupled to a second one of the side edges of the central extent such that the second side extent lies in a plane that forms a 120 degree angle with a plane in which the central extent lies, the plane of the first side extent being oriented substantially parallel to the plane of the second side extent;

said first side extent of the head further including an upturned portion adjacent to one of the end edges and separated from the central extent of the head, the upturned portion having a width of about ½ of a width of the first side extent of the head, and the first side extent having an outer terminal edge that is sharpened and that has a first linear portion and a second beveled portion;

wherein one of the end edges of the second side extent of the head has a tapered configuration;

a grip for gripping by a hand of a user for permitting manipulation of the head by the use in a crouch position, the grip having an inverted U-shaped configuration having a pair of ends coupled to a top surface of the first side extent of the head adjacent to the central extent of the head, wherein the grip lies within a plane positioned in perpendicular relationship with that in which the first side extent of the head resides:

a handle rod mount including a substantially conical socket having a tapered end integrally coupled to one of the ends of the grip and extending therefrom away from the extension of the first side extent of the head and in coplanar relationship with the grip at an angle of about 30 degrees with respect to the plane in which the first side extent of the head resides, the handle rod mount having a pair of bores formed therein for removably coupling a handle rod therein in coaxial relationship therewith; and a handle rod for removably coupling to the handle rod mount for permitting manipulation of the head by the user in a standing position.

* * * * *